(12) United States Patent
Kim et al.

(10) Patent No.: US 9,434,357 B2
(45) Date of Patent: Sep. 6, 2016

(54) APPARATUS FOR CLEANING TAIL GATE GLASS FOR VEHICLE

(71) Applicant: Hyundai Motor Company, Seoul (KR)

(72) Inventors: Nam Cheol Kim, Suwon-Si (KR); Seung Mok Lee, Osan-si (KR); Jeong Ho Lee, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/525,064

(22) Filed: Oct. 27, 2014

(65) Prior Publication Data

US 2015/0307065 A1 Oct. 29, 2015

(30) Foreign Application Priority Data

Apr. 23, 2014 (KR) .................. 10-2014-0048784

(51) Int. Cl.
*B60S 1/52* (2006.01)
*B60S 1/58* (2006.01)
*B62D 35/00* (2006.01)

(52) U.S. Cl.
CPC .. *B60S 1/52* (2013.01); *B60S 1/58* (2013.01); *B62D 35/007* (2013.01)

(58) Field of Classification Search
CPC ......... B32B 27/12; B32B 27/40; B32B 5/18; B62D 25/02; B29K 2075/00; B29K 2105/12; B60H 1/00285; B60H 2001/003
USPC .......... 296/146.7, 1.08, 153, 70, 146.1, 210; 264/165, 175, 219, 255, 302; 46/502, 46/489.1, 503, 506

See application file for complete search history.

(56) References Cited

U.S. PATENT DOCUMENTS

| | | |
|---|---|---|
| 5,074,612 A | 12/1991 | Liese et al. |
| 5,271,120 A * | 12/1993 | Eustache ............... B60S 1/0419 |
| | | 15/250.01 |

(Continued)

FOREIGN PATENT DOCUMENTS

| | | |
|---|---|---|
| EP | 1 593 565 B1 | 3/2007 |
| JP | 2005-329772 A | 12/2005 |
| JP | 2008-62810 A | 3/2008 |
| KR | 1996-004807 Y1 | 2/1996 |
| KR | 1997-0020782 A | 5/1997 |

(Continued)

*Primary Examiner* — Glenn Dayoan
*Assistant Examiner* — Sunsurraye Westbrook
(74) *Attorney, Agent, or Firm* — Morgan, Lewis & Bockius LLP

(57) ABSTRACT

An apparatus for cleaning a tail gate glass for a vehicle may include a spoiler door rotatably installed on a rear spoiler; an outlet formed at a position of the rear spoiler facing the spoiler door; an air duct installed in an internal space of the rear spoiler and guiding external air introduced through the spoiler door to the outlet; a nozzle fixed to the rear spoiler and spraying a cleaning liquid to the tail gate glass; and a door opening and closing device fixed to the rear spoiler, having a first end connected to the spoiler door and a second end fluid-connected to a cleaning liquid hose, and operated to open and close the spoiler door depending on a change in a pressure of the cleaning liquid hose.

8 Claims, 4 Drawing Sheets

(56) References Cited

U.S. PATENT DOCUMENTS

| | | | |
|---|---|---|---|
| 5,779,096 A * | 7/1998 | Cockfield | B60S 1/50 116/227 |
| 6,026,974 A * | 2/2000 | Burt | B60K 15/00 220/23.4 |
| 6,523,882 B2 * | 2/2003 | Ishikawa | B60J 5/0416 296/146.5 |
| 7,311,351 B1 * | 12/2007 | Nahm | B60S 1/52 296/180.1 |
| 7,503,619 B2 * | 3/2009 | Werner | B60J 1/1884 296/106 |
| 2005/0133623 A1 * | 6/2005 | Lee | B60S 1/50 239/302 |

FOREIGN PATENT DOCUMENTS

| | | |
|---|---|---|
| KR | 1998-028239 A | 7/1998 |
| KR | 10-2007-0109137 A | 11/2007 |
| KR | 10-0792576 B1 | 1/2008 |

* cited by examiner

APPARATUS FOR CLEANING TAIL GATE GLASS FOR VEHICLE

CROSS REFERENCE TO RELATED APPLICATION

The present application claims priority to Korean Patent Application No. 10-2014-0048784, filed on Apr. 23, 2014, the entire contents of which is incorporated herein for all purposes by this reference.

BACKGROUND OF THE INVENTION

1. Field of the Invention

The present invention relates to an apparatus for cleaning a tail gate glass for a vehicle, and more particularly, to an apparatus for cleaning a tail gate glass for a vehicle capable of cleaning the tail gate glass by scattering a cleaning liquid sprayed to the tail gate glass using wind generated by driving of vehicle, that is, driving wind.

2. Description of Related Art

Generally, in a hatch back vehicle, a sports utility vehicle (SUV), and a multi-purpose vehicle (MPV) having a high overall height, a drag occurs at the rear of the vehicle, and dust or moisture included in the air easily pollutes a tail gate glass (rear glass) due to the drag.

In addition, when the vehicles having the high overall height are driven at a high speed, a lift phenomenon that a vehicle body is lifted easily occurs, and fuel efficiency and driving stability are deteriorated due to the lift phenomenon.

Therefore, as shown in FIG. 1, in order to remove a pollutant of a tail gate glass 1, a technology of spraying a cleaning liquid (washer liquid) to the tail gate glass 1 at a high pressure using a nozzle and operating a rear wiper 2 to clean the tail gate glass 1 using the sprayed cleaning liquid has been universally used. In addition, a technology of using a rear spoiler 3 to prevent a lift phenomenon when a vehicle is driven at a high speed, thereby securing driving stability of the vehicle has been used.

However, in a scheme of removing the pollutant of the tail gate glass 1 using the rear wiper 2, an actuator (motor) for operating the rear wiper 2 is required. As a result, there is a disadvantage that a cost and a weight are increased.

In addition, there is also a disadvantage that the rear wiper 2, which is a consumable, should be replaced by a new product after it is used for a predetermined period.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for cleaning a tail gate glass for a vehicle capable of cleaning a pollutant of the tail gate glass by scattering a cleaning liquid sprayed to the tail gate glass using driving wind, that is, wind generated by driving of vehicle, without using a rear wiper, thereby allowing an actuator (motor) for operating the rear wiper not to be used to promote a decrease in a cost and a weight of the apparatus for cleaning a tail gate glass for a vehicle and allow the apparatus for cleaning a tail gate glass for a vehicle to be semi-permanently used.

In an aspect of the present invention, an apparatus for cleaning a tail gate glass for a vehicle, may include a spoiler door rotatably installed on a rear spoiler, an outlet formed at a position of the rear spoiler facing the spoiler door, an air duct installed in an internal space of the rear spoiler and guiding external air introduced through the spoiler door to the outlet, a nozzle fixed to the rear spoiler and spraying a cleaning liquid to the tail gate glass, and a door opening and closing device fixed to the rear spoiler, having a first end connected to the spoiler door and a second end fluid-connected to a cleaning liquid hose, and operated to open and close the spoiler door depending on a change in a pressure of the cleaning liquid hose.

The spoiler door may have a rear portion coupled to an upper panel part of the rear spoiler through a hinge and a front portion rotated around the hinge, such that the spoiler door is opened and closed.

The outlet is formed in a lower panel part of the rear spoiler in a mesh structure and is formed to be opened toward the tail gate glass.

Sealing pads are coupled to upper and lower ends of the air duct, respectively, in order to maintain air-tightness with the rear spoiler.

A nozzle hose is connected to a point at which the cleaning liquid hose and the door opening and closing device are connected to each other in a branch form, and the nozzle is coupled to an end of the nozzle hose.

The door opening and closing device may include a cylinder hose branched from a point at which the cleaning liquid hose and the nozzle hose are connected to each other, a cylinder connected to the cylinder hose, a piston moving along the cylinder, and a door link pivotally connecting the piston and the spoiler door to each other.

The nozzle hose may have a diameter relatively smaller than that of the cylinder hose.

The apparatus for cleaning the tail gate glass for the vehicle may further may include a reservoir tank connected to the cleaning liquid hose and storing the cleaning liquid therein, and a cleaning liquid motor provided on the cleaning liquid hose and operated so that the cleaning liquid in the reservoir tank is transferred to the nozzle and the door opening and closing device at a time of being operated depending on an operation of a switch.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
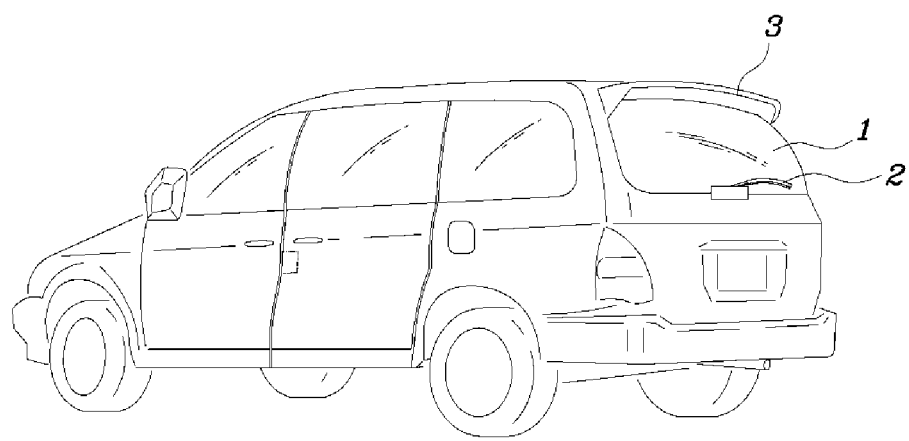
FIG. 1 is a diagram for describing a structure according to the related art cleaning a tail gate glass using a rear wiper.
Figure 2:
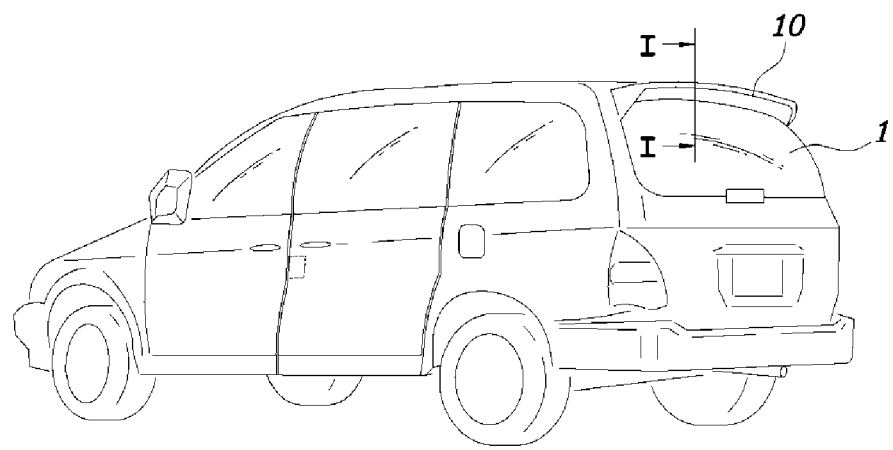
FIG. 2 is a perspective view of a vehicle including an apparatus for cleaning a tail gate glass for a vehicle according to an exemplary embodiment of the present invention.
Figure 3:
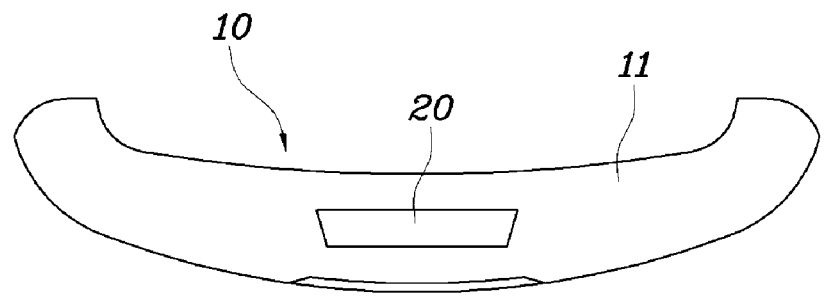
FIG. 3 is a plan view of a rear spoiler including a spoiler door according to an exemplary embodiment of the present invention.
Figure 4A:
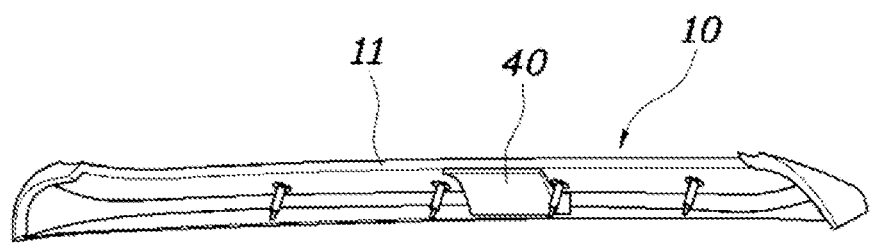
FIG. 4A and FIG. 4B are bottom views of the rear spoiler on which the apparatus for cleaning a tail gate glass for a vehicle according to an exemplary embodiment of the present invention is installed.
Figure 4B:
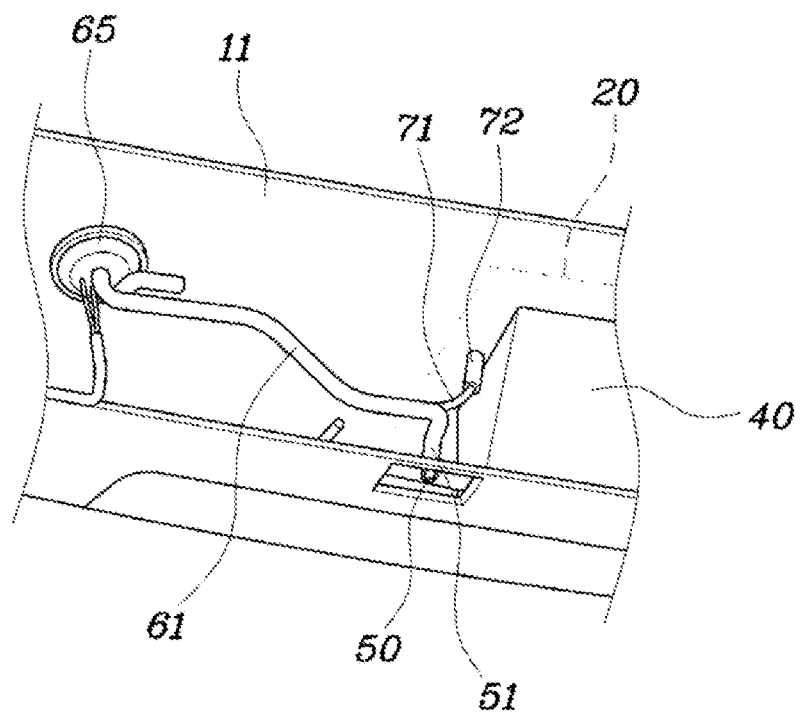
Figure 5:
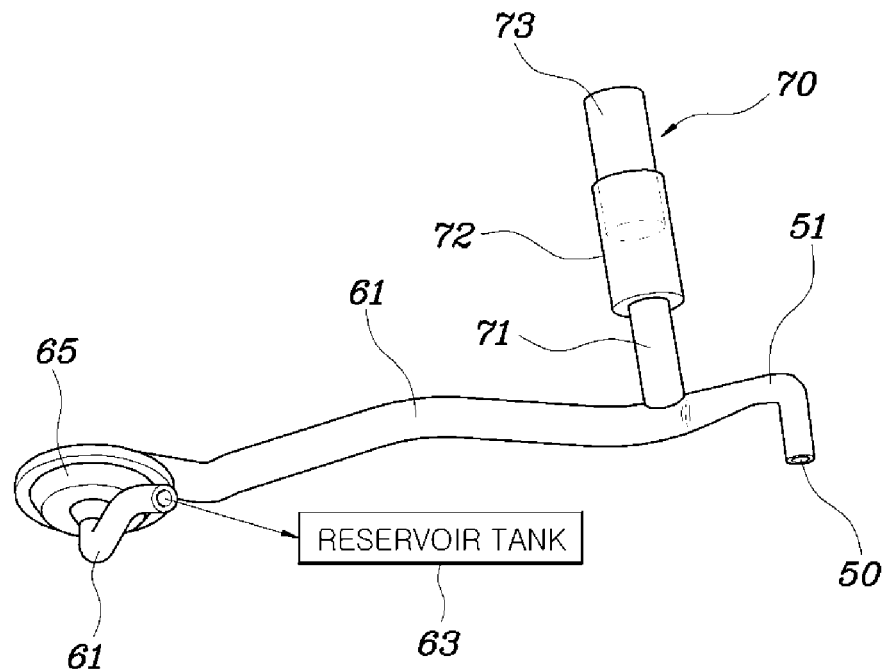
FIG. 5 is a perspective view for describing a washer liquid hose, a nozzle hole, and a door opening and closing device according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an apparatus for cleaning a tail gate glass for a vehicle according to an exemplary embodiment of the present invention will be described with reference to the accompanying drawings.

An apparatus for cleaning a tail gate glass for a vehicle according to an exemplary embodiment of the present invention includes a spoiler door 20 rotatably installed on a rear spoiler 10, an outlet 30 formed at a position of the rear spoiler 10 facing the spoiler door 20, an air duct 40 installed in an internal space of the rear spoiler 10 and guiding external air introduced through the spoiler door 20 to the outlet, a nozzle 50 fixed to the rear spoiler 10 and spraying a cleaning liquid (washer liquid) to the tail gate glass 1, and a door opening and closing device 70 fixed to the rear spoiler 10, having one end connected to the spoiler door 20 and the other end connected to a cleaning liquid hose 61, and operated so as to open and close the spoiler door 10 depending on a change in a pressure of the cleaning liquid hose 61, as shown in FIGS. 2 to 7.

Here, the rear spoiler 10 is fixed to an upper portion of a rear tail gate panel 5 of a vehicle body in a hatch back vehicle, a sports utility vehicle (SUV), and a multi-purpose vehicle (MPV) having a high overall height through a coupling member such as a fixing bolt.

In addition, the apparatus for cleaning a tail gate glass for a vehicle according to an exemplary embodiment of the present invention further includes a reservoir tank 63 connected to the cleaning liquid hose 61 and storing the cleaning liquid therein, and a cleaning liquid motor 65 provided on the cleaning liquid hose 61 and operated so that the cleaning liquid in the reservoir tank 63 may be transferred to the nozzle 50 and the door opening and closing device 70 at the time of being operated depending on an operation of a switch.

That is, when a driver operates the switch in order to spray the cleaning liquid, the cleaning liquid motor 65 is operated, and the cleaning liquid in the reservoir tank 63 is pumped by the operation of the cleaning liquid motor 65 and is transferred to the nozzle 50 and the door opening and closing device 70 through the cleaning liquid hose 61. In this case, a pressure in the cleaning liquid hose 61 rises due to the movement of the cleaning liquid to the nozzle 50 and the door opening and closing device 70.

A rear portion of the spoiler door 20 is coupled to an upper panel part 11 of the rear spoiler 10 through a hinge 21 and a front portion of the spoiler door 20 is rotated around the hinge 21, such that the spoiler door 20 is opened and closed.

Figure 6:
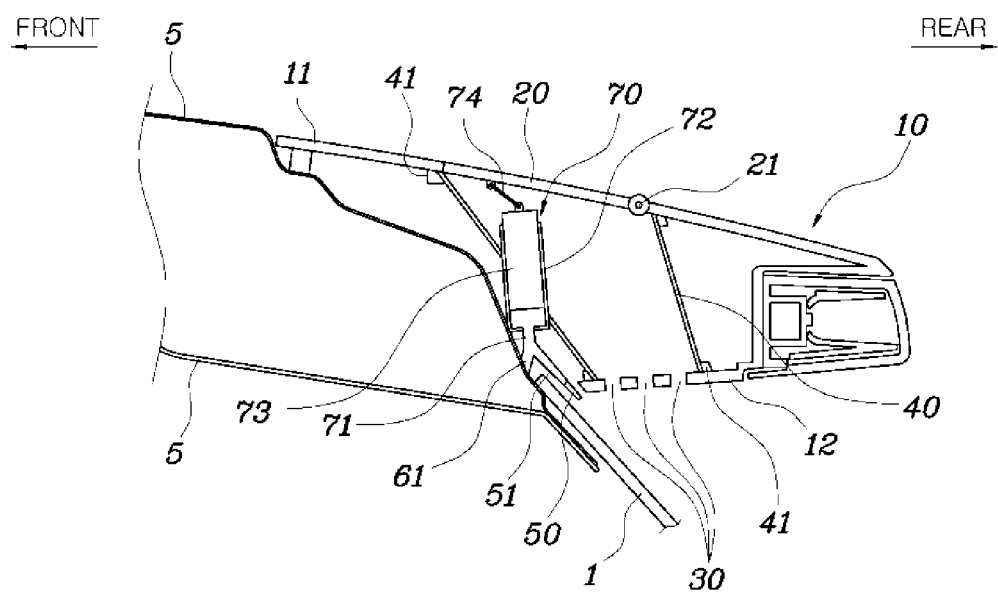
FIG. 6 is a cross-sectional view taken along line I-I of FIG. 2 showing a state before the spoiler door is operated.

That is, in FIG. 6, the spoiler door 20 is in a closed state in which it is integrated with the upper panel part 11 of the rear spoiler 10. In this case, driving wind is not introduced into the air duct 40.

Figure 7:
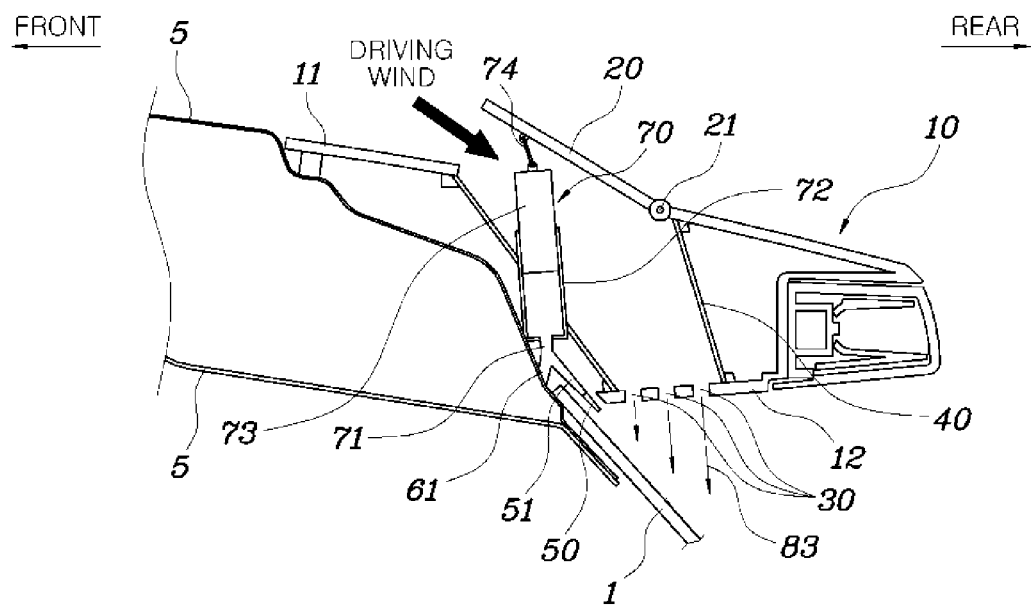
FIG. 7 is a diagram showing a state after the spoiler door is operated.

Further, in FIG. 7, a front portion of the spoiler door 20 is in an opened state in which it is rotated upwardly around the hinge 21 disposed at a rear portion thereof to thereby be lifted. In this case, the driving wind is introduced into the air duct 40 through the opened spoiler door 20.

A plurality of outlets 30 are formed in a lower panel part 12 of the rear spoiler 10 in a mesh structure. All of the outlets 30 are formed so as to be opened toward the tail gate glass 1.

Therefore, the driving wind introduced into the air duct 40 when the spoiler door 20 is opened is discharged to the tail gate glass 1 through the outlets 30, and the cleaning liquid sprayed to the tail gate glass 1 through the nozzle 50 is scattered by the driving wind discharged through the outlets 30 to clean a pollutant of the tail gate glass 1.

It is preferable that the driving wind introduced into the air duct 40 when the spoiler door 20 is opened is completely discharged through the outlets 30 without being leaked to the outside of the air duct 40. To this end, it is preferable that sealing pads 41 are coupled to upper and lower ends of the air duct 40, respectively, in order to maintain air-tightness with the rear spoiler 10.

In an exemplary embodiment of the present invention, a nozzle hose 51 is connected to a point at which the cleaning liquid hose 61 and the door opening and closing device 70 are connected to each other in a branch form, and the nozzle 50 is coupled to an end of the nozzle hose 51.

The door opening and closing device 70 according to an exemplary embodiment of the present invention includes a cylinder hose 71 branched from a point at which the cleaning liquid hose 61 and the nozzle hose 51 are connected to each other, a cylinder 72 connected to the cylinder hose 71, a piston 73 moving along the cylinder 72, and a door link connecting the piston 73 and the spoiler door 20 to each other.

The door link 74 may be a single link or a multi joint link, and it is preferable that one end of the door link 74 connected to the piston 73 and the other end thereof connected to the spoiler door 20 are coupled to the piston 73 and the spoiler door 20 so as to be rotatable through a rotation mechanism such as a ball joint.

Meanwhile, the nozzle hose 51 has a diameter relatively smaller than those of the cleaning liquid hose 61 and the cylinder hose 71, and the cylinder hose 71 has a diameter relatively smaller than that of the cleaning liquid hose 61.

In the case in which the nozzle hose 51 has a diameter relatively smaller than that of the cylinder hose 71 as described above, when the cleaning liquid in the reservoir tank 63 is transferred to the nozzle hose 51 and the cylinder hose 71 through the cleaning liquid hose 61 by an operation of the cleaning liquid motor 65, a pressure in the nozzle hose 51 rises more rapidly as compared with a pressure in the cylinder hose 71 and is transferred to the cylinder hose 71 to instantaneously raise rapidly a pressure in the cylinder 72. Therefore, the piston 73 is operated before the cleaning liquid is sprayed through the nozzle 50, thereby opening the spoiler door 20. Then, the cleaning liquid is sprayed to the tail gate glass 1 through the nozzle 50.

Hereinafter, an operation of an exemplary embodiment of the present invention will be described.

In FIG. 6, a state in which the driver does not operate a cleaning liquid spraying switch is shown. In this state, the cleaning liquid motor 65 is not operated, such that the cleaning liquid in the reservoir tank 63 is not transferred to the cleaning liquid hose 61. Therefore, the spoiler door 20 is maintained in a closed state, and the driving wind is not introduced into the air duct 40 even when the vehicle is driven.

Further, in FIG. 7, a state in which the driver operates the cleaning liquid spraying switch is shown. In this state, the cleaning liquid motor 65 is operated, such that the cleaning liquid in the reservoir tank 63 is pumped by the operation of the cleaning liquid motor 65 and transferred to the nozzle hose 51 and the cylinder hose 71 through the cleaning liquid hose 61.

In this case, the piston 73 is first operated due to an internal pressure difference due to a diameter difference between the nozzle hose 51 and the cylinder hose 71, thereby opening the spoiler door 20. Then, the cleaning liquid is sprayed to the tail gate glass 1 through the nozzle 50.

When the spoiler door 20 is opened as described above, the driving wind is introduced into the air duct 40 and is then discharged to the tail gate glass 1 through the outlets 30. In this case, the cleaning liquid sprayed to the tail gate glass 1 through the nozzle 50 is scattered by the driving wind discharged through the outlets 30 to clean a pollutant of the tail gate glass 1.

Reference numeral 83 shown in FIG. 7 indicates the driving wind discharged to the tail gate glass through the outlets.

In addition, when the operation of the cleaning liquid motor 65 ends after a predetermined time elapses, the opened spoiler door 20 returns to an initial closed state as shown in FIG. 6 by a decrease in pressures in the cleaning liquid hose, the nozzle hose 51, and the cylinder hose 71 and then prepares the next operation.

As described above, according to an exemplary embodiment of the present invention, the cleaning liquid sprayed to the tail gate glass 1 is scattered using the driving wind at the time of an operation of the cleaning liquid spraying switch by the driver to clean the pollutant of the tail gate glass 1, thereby making it possible to allow a rear wiper for cleaning the tail gate glass 1 not to be used. In addition, it is not required to use an actuator (motor) for operating the rear wiper, such that a cost and a weight of the apparatus for cleaning a tail gate glass for a vehicle may be decreased and the apparatus for cleaning a tail gate glass for a vehicle may be semi-permanently used.

According to an exemplary embodiment of the present invention, the cleaning liquid sprayed to the tail gate glass is scattered using the driving wind to clean the pollutant of the tail gate glass, thereby making it possible to allow the rear wiper and the actuator (motor) for operating the rear wiper not to be used. Therefore, a cost and a weight of the apparatus for cleaning a tail gate glass for a vehicle may be decreased.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. An apparatus for cleaning a tail gate glass for a vehicle, comprising:
    a spoiler door rotatably installed on a rear spoiler;
    an outlet formed at a position of the rear spoiler facing the spoiler door;
    an air duct installed in an internal space of the rear spoiler and guiding external air introduced through the spoiler door to the outlet;
    a nozzle fixed to the rear spoiler and spraying a cleaning liquid to the tail gate glass; and
    a door opening and closing device fixed to the rear spoiler, having a first end connected to the spoiler door and a second end fluid-connected to a cleaning liquid hose, and operated to open and close the spoiler door depending on a change in a pressure of the cleaning liquid hose.

2. The apparatus for cleaning the tail gate glass for the vehicle of claim 1, wherein the spoiler door has a rear portion coupled to an upper panel part of the rear spoiler through a hinge and a front portion rotated around the hinge, such that the spoiler door is opened and closed.

3. The apparatus for cleaning the tail gate glass for the vehicle of claim 1, wherein the outlet is formed in a lower panel part of the rear spoiler in a mesh structure and is formed to be opened toward the tail gate glass.

4. The apparatus for cleaning the tail gate glass for the vehicle of claim 1, wherein sealing pads are coupled to upper and lower ends of the air duct, respectively, in order to maintain air-tightness with the rear spoiler.

5. The apparatus for cleaning the tail gate glass for the vehicle of claim 1,
    wherein a nozzle hose is connected to a place at which the cleaning liquid hose and the door opening and closing device are connected to each other in a branch form, and
    wherein the nozzle is coupled to an end of the nozzle hose.

6. The apparatus for cleaning the tail gate glass for the vehicle of claim 5, wherein the door opening and closing device includes:
    a cylinder hose branched from a place at which the cleaning liquid hose and the nozzle hose are connected to each other;
    a cylinder connected to the cylinder hose;
    a piston moving along the cylinder; and
    a door link pivotally connecting the piston and the spoiler door to each other.

7. The apparatus for cleaning the tail gate glass for the vehicle of claim 6, wherein the nozzle hose has a diameter relatively smaller than that of the cylinder hose.

8. The apparatus for cleaning the tail gate glass for the vehicle of claim 1, further comprising:
   a reservoir tank connected to the cleaning liquid hose and storing the cleaning liquid therein; and
   a cleaning liquid motor provided on the cleaning liquid hose and operated so that the cleaning liquid in the reservoir tank is transferred to the nozzle and the door opening and closing device at a time of being operated depending on an operation of a switch.

* * * * *